United States Patent [19]
Schornhorst

[11] 3,928,011
[45] Dec. 23, 1975

[54] APPARATUS AND METHOD FOR CONTROLLING THE ORIENTATION OF A NEWLY-FORMED CONTINUOUS SHEET OF FLAT GLASS

[75] Inventor: James R. Schornhorst, Pittsburgh, Pa.

[73] Assignee: PPG Industries, Inc., Pittsburgh, Pa.

[22] Filed: Oct. 15, 1974

[21] Appl. No.: 514,968

[52] U.S. Cl. ............... 65/65 A; 65/99 A; 65/162; 65/182 R
[51] Int. Cl.² ............................. C03B 18/02
[58] Field of Search...... 65/65 A, 99 A, 182 R, 162, 65/204

[56] References Cited
UNITED STATES PATENTS

| | | | |
|---|---|---|---|
| 2,896,376 | 7/1959 | Crandon, Jr. | 65/204 |
| 3,420,647 | 1/1969 | Charnock | 65/65 A |
| 3,619,159 | 11/1971 | Shirley | 65/162 |

*Primary Examiner*—Arthur D. Kellogg
*Attorney, Agent, or Firm*—E. Kears Pollock

[57] ABSTRACT

Flat glass is produced by advancing a layer of molten glass on the surface of molten metal while cooling it sufficiently to form a continuous sheet of glass which is lifted upwardly from the surface of the supporting pool of molten metal and conveyed upwardly from it for further processing. A method is provided for selectively controlling the temperature, and thus the viscosity, of the glass comprising the marginal edge portions of the continuous sheet of glass in order to adjust and maintain a selected radius of curvature of the respective edge portions of the continuous sheet of glass as it is lifted upwardly from the supporting pool of molten metal and to thereby control the orientation of the continuous sheet of glass as it is ascending from the supporting pool of molten metal.

15 Claims, 10 Drawing Figures

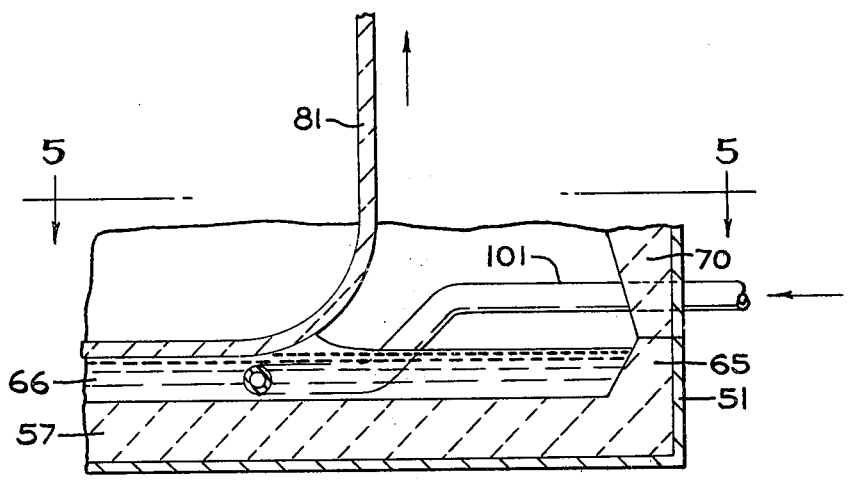
Fig. 4
Fig. 5
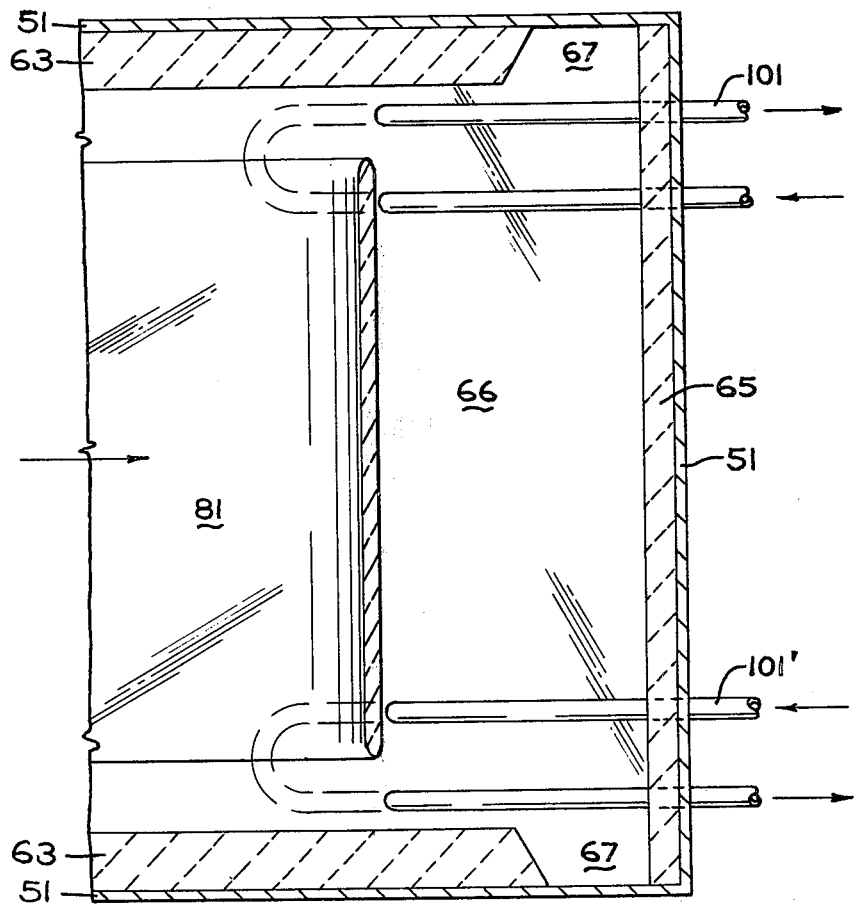

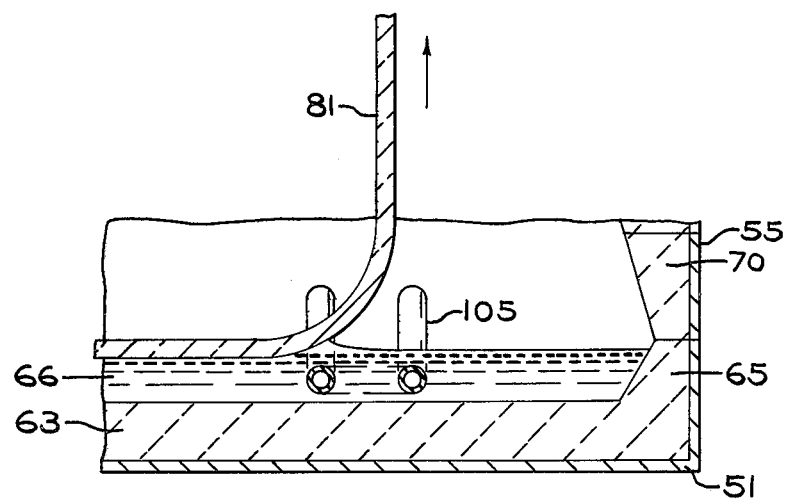
FIG.6
FIG.7
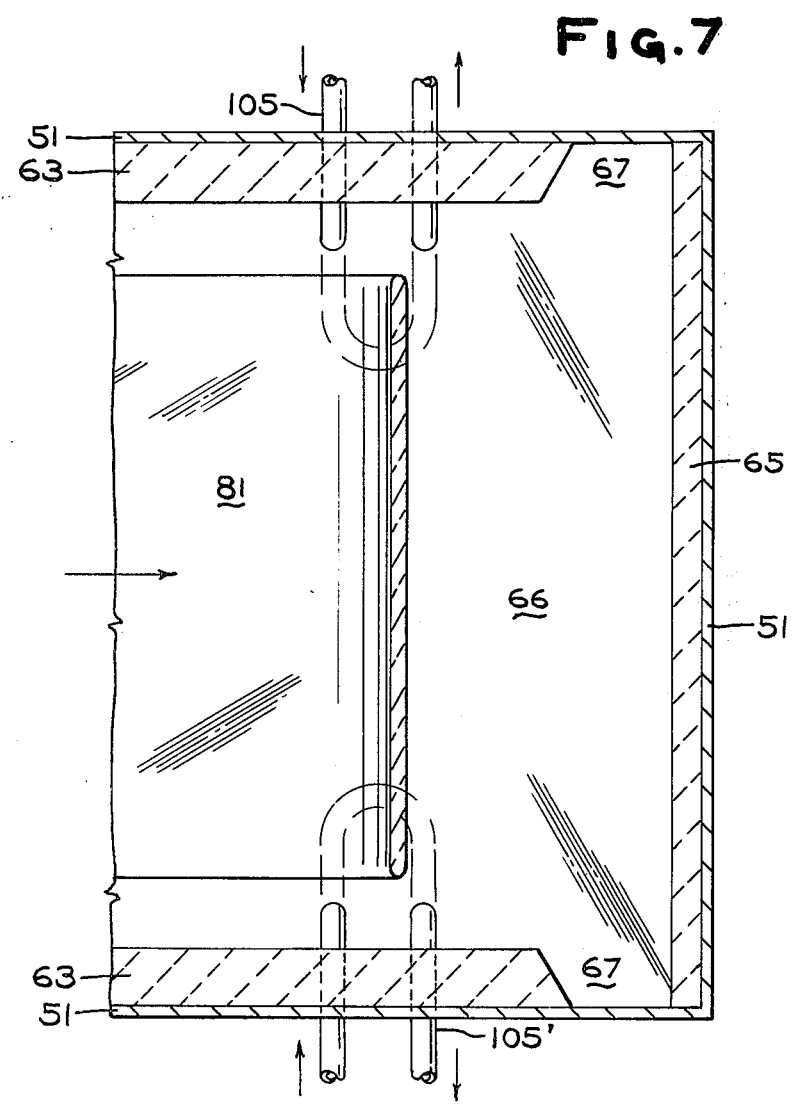

APPARATUS AND METHOD FOR CONTROLLING THE ORIENTATION OF A NEWLY-FORMED CONTINUOUS SHEET OF FLAT GLASS

CROSS REFERENCE TO RELATED APPLICATIONS

This application is related to application Ser. No. 483,508, entitled, "Manufacture of Glass", filed June 27, 1974, by Gerald E. Kunkle and assigned to the present assignee.

BACKGROUND OF THE INVENTION

1. Field of the Invention

This invention relates to the method for the manufacture of a continuous sheet of flat glass by supporting molten glass on a pool of molten metal while cooling and forming the glass. More particularly, this invention relates to a method for selectively controlling the temperature of the glass at the location where the glass is removed from the supporting pool of molten metal to minimize the development of strain within the glass.

2. Description of the Prior Art

Molten glass may be delivered onto molten metal and formed into a continuous sheet or ribbon of flat glass according to the teachings of Heal, U.S. Pat. No. 710,357 or Hitchcock, U.S. Pat. No. 789,911; or according to the teachings of Pilkington, U.S. Pat. Nos. 3,083,551 and 3,220,816; or according to the teachings of Edge and Kunkle, application Ser. No. 338,497 filed Mar. 6, 1973. These patents described processes in which continuous sheets of flat glass are formed while the glass being formed is supported on molten metal. These patents are primarily concerned with different methods for delivering molten glass to the surface of a pool of molten metal and different methods of treating the glass while supported thereon. After a continuous sheet of glass has been formed, it has been shown to be removed from the surface of a pool of supporting molten metal by lifting it slightly and conveying it away from the pool of molten metal. It has also been shown in U.S. Pat. No. 3,233,995 to Javaux and U.S. Pat. No. 3,420,647 to Charnock that molten glass delivered onto the supporting surface of a pool of molten metal may be cooled insufficiently to form a continuous sheet of glass having fixed dimensions and then the unfinished layer of glass is drawn upwardly from the surface of a pool of molten metal to form a continuous sheet of glass having stable dimensions. The layer of glass is cooled and formed during such upward drawing, with such drawing being in the nature of sheet glass drawing as known per se in the Pittsburgh, Colburn or Fourcault process.

In the cross-referenced, related application already referred to, Kunkle describes a process wherein a layer of molten glass is delivered onto a surface of a pool of molten metal and is advanced thereon and cooled to form a dimensionally stable, continuous sheet of glass having a fixed width and thickness, and this completely formed sheet of glass is then lifted upwardly from the surface of the pool of molten metal and conveyed upwardly, preferably vertically, from the pool of molten metal. As the ascending sheet of glass is conveyed upwardly, it is engaged above the surface of the pool of molten metal by traction-applying means such as the rolls of a conveyor. It is desirable that stresses within the glass be avoided in the method of Kunkle as it is a method having the purpose of minimizing thermally-induced stresses within the glass during its horizontal advance, during its lifting and during its upward conveyance into and through the upward conveying apparatus provided. The present invention is concerned with means for alleviating and preventing the development of stresses within the glass due to misalignment or disorientation of the sheet of glass caused by uneven mechanical forces acting upon the sheet of glass as it enters a conveying mechanism. This invention provides for preventing substantial disorientation of a sheet of glass ascending upwardly from a pool of molten metal and entering the lowermost traction-applying engaging elements of a conveying apparatus.

SUMMARY OF THE INVENTION

A continuous sheet of flat glass is produced by a method including the following steps: Molten glass is delivered onto the surface of a pool of molten metal maintained within a forming chamber. The molten metal is preferably tin, an alloy of tin or some other metal having a specific gravity greater than the glass and having a melting point lower than the glass to be formed while being substantially nonreactive to the glass and its melting temperature. The layer of molten glass is advanced along the surface of the pool of molten metal and is cooled during such advance to form a dimensionally stable, continuous sheet of glass.

Forces are applied to the glass while it is advanced along the surface of the pool of molten metal. Forces may be applied to the glass which are aligned substantially along its path to cause it to be advanced and may cause it to be attenuated with thinner during its advance. These forces are characterized as longitudinal tractive forces and may be applied to any location along the length of the glass sheet. They are preferably applied to the glass at locations well along its path of advance and are transferred to the hot or more fluid glass primarily by the surface tension of the glass. Other forces may be applied to the glass in the manner such that they are aligned substantially across or transverse to its path of advance, and these are characterized and transverse forces. The resultant forces, caused by the application of the described forces in combination with the reactive surface tension and gravity forces acting on the glass, cause it to be formed into a continuous, flat sheet of desired thickness.

After the glass has been cooled sufficiently to become dimensionally stable (that is, if it has reached its final width and thickness) it is advanced farther along the surface of molten metal and then is lifted from the surface of the pool of molten metal and conveyed from the forming chamber. The continuous sheet of glass is lifted and conveyed upwardly from the pool of molten metal in the manner described by Gerald E. Kunkle in its copending, commonly assigned patent application which is incorporated by reference herein.

The glass is cooled sufficiently prior to lifting it from the surface of the pool of molten metal so that its width and thickness remain unchanged during lifting and conveyance from the forming chamber. It is desirable to adjust or control the temperature of the glass so that its viscosity will be within the range from about $10^5$ to $10^{12.5}$ poises at the time of lifting. It is further desirable to adjust and maintain the temperature of the glass during its upward conveyance so that the temperature will be decreased sufficiently to cause the viscosity to be greater than about $10^{13}$ poises while maintaining the glass in flat, planar alignment. The continuous sheet of glass is permitted to freely form a curved, lifting region having a radius indicated by the temperature and viscosity of the glass. Immediately before and immediately after the glass is lifted from the supporting pool of molten metal, the marginal edge portions of the glass are separately and individually conditioned to control the radius of curvature of the glass as it is lifted from the supporting pool of molten metal. In this way the orientation of the vertically ascending portion of the continuous sheet of glass is controlled and aligned with the plane of conveyance through a conveyor extending upwardly above the forming chamber. The marginal edge portions of the continuous sheet of glass are preferably conditioned by exposure to separate controllable coolers, one extending in from one side of the forming chamber over the marginal edge portion of the continuous sheet of glass closest thereto, and the other in a corresponding position on the opposite side of the forming chamber and disposed over the marginal edge portion of the continuous sheet of glass closest to it.

Since the glass is freely and easily moved along the surface of a pool of molten metal, a change of radius of curvature of the glass as kit is lifted causes the glass to move laterally or transversely from a centrally disposed path of advance along the surface of the pool of molten metal. Thus, if the continuous sheet of glass being formed appears to be drifting toward the left side of the forming chamber, for example, its radius of curvature may be relatively decreased and its liftoff point caused to move downstream farther from the location where molten glass is delivered to the forming chamber and, consequently, its edge moved farther from the sidewall of the forming chamber by decreasing the rate of cooling of that marginal edge portion. This may be accompanied by a complementary increase in the rate of cooling of the right marginal portion of the continuous sheet of glass.

This invention will be further understood with reference to the drawings accompanying this description.

BRIEF DESCRIPTION OF THE DRAWINGS

FIGS. 4 and 5 shown an alternate embodiment of the present invention in a partial section elevation view and a partial sectional plan view, respectively;

FIGS. 6 and 7, like FIGS. 4 and 5, also show an alternate embodiment of the present invention in a partial sectional elevation view and a partial sectional plan view, respectively.

DESCRIPTION OF THE PREFERRED EMBODIMENTS

Figure 1:
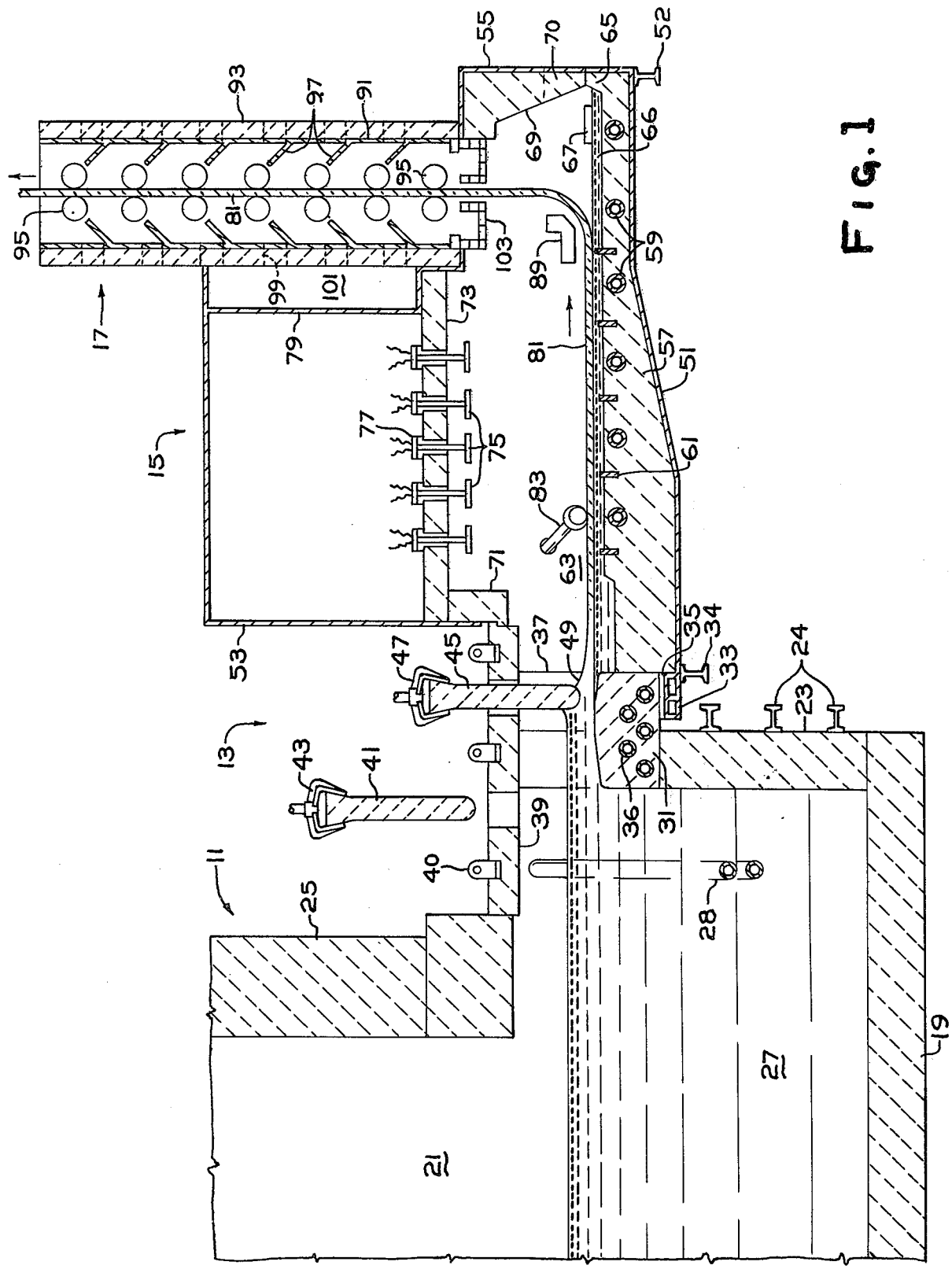
FIG. 1 is a sectional elevation view of an apparatus for producing flat glass in accordance with this invention.

Referring now to FIG. 1 there is shown a view of a suitable apparatus for carrying out the present invention. The glassmaking apparatus comprises a furnace 11, delivery means 13 and a forming chamber 15 and a vertical conveyor 17 which may be, and preferably is, included in an annealing lehr. It will be understood that the lifting and conveying apparatus employed in the practice of this invention may cause the glass to be conveyed along an upwardly extending path that need not be vertical as shown in FIG. 1.

The glassmaking furnace 11 includes a melting section (not shown) and a refiner or conditioner, the end of which is shown. The refiner or conditioner section of the furnace 11 comprises a furnace bottom 19, sidewalls 21 and a front basin wall 23. The front basin wall 23 is maintained in position by structural member 24. The furnace further comprises an upper front wall 25 which is preferably suspended or supported from above and roof overlying the upper portion of the furnace, the roof not being shown.

The delivery means 13 includes a threshold 31 resting on a cooling block 33 or other support, which is supported by structural members 34. A cast refractory seal 35 or the like is disposed between the threshold 31 and the cooling block 33. Extending through the holes in the threshold ae conduits or pipes 36 for transporting coolant or the like through the interior of the threshold 31 and for controlling its temperature during use. At the ends of the threshold 31 there are sidewall portions or jambs 37 on the sides of the channel through which molten glass may be delivered from the pool of molten glass 27 residing in the bottom portion of the furnace 11. The top of the delivery means 13 is defined by a roof 39. The roof is preferably a flat arch which is supported by supporting means (not shown). The supporting means extend above the roof and are connected to flat arch supporters 40 embedded in the flat arch itself. Extending transversely across the delivery means 13 are two gates or tweels. The first of these is a backup tweel 41 connected to a support assembly 43 (not fully shown) for raising or lowering it into engagement in the pool of molten glass 27. The second tweel is a control tweel 45 supported by support assembly 47 (not fully shown) for raising and lowering the tweel. The tweel is held in operating position in contact with the molten glass to be delivered for forming. The control tweel 45, along with the threshold 31 and the jambs 37, defines an opening through which a layer of molten glass 49 may be delivered for forming.

The forming chamber 15 comprises a bottom casing 51 supported on support 62 in addition to support 34. This casing is preferably a casing constructed of metal, such as steel. The casing is preferably impervious to the molten metal in the chamber. The forming chamber 15 further comprises a top casing 53 and an end casing 55. Both of these casing members are also preferably constructed of impervious meal. Disposed within the bottom casing 51 is a refractory bottom 57, preferably a refractory bottom that has been cast in place inside the bottom casing 51. Preferably embedded within the bottom refractory 57 are pipes 59 through which coolant or other fluid may be directed for controlling the temperature of the forming chamber 15 at discrete locations along its length. Also extending transversely across the forming chamber 15 are dams or weirs 61 mounted in the refractory bottom 57 and extending across its width. These dams are preferably adjustable and are held down at their ends at each side of the forming chamber. They are preferably constructed of material that is less dense than the molten metal in the forming chamber so that their vertical position may be varied upwardly or downwardly by controlled adjustment of holddown devices at their ends.

The forming chamber 15 further comprises refractory sidewalls 63 and a refractory exit lip 65. These, along with the bottom refractory 57 and the threshold 21, define a container in which a pool of molten metal 66, preferably molten tin or an alloy of tin, is disposed. At the downstream end of the forming chamber there are provided extensions 67 of the bottom container portion of the forming chamber which serve as cavities into which dross floating on the surface of the molten metal 66 may be withdrawn for removal from the forming chamber. The upper portion of the forming chamber includes an end wall liner 69, preferably constructed of refractory material. This liner 69 and the end casing 55 to which it is connected may include a suitable opening 70 through which a continuous sheet of glass may be withdrawn from the forming chamber along a substantially horizontal path in the event that such removal is temporarily desired.

The upper portion of the chamber further includes a lintel 71 at its upstream end. This lintel 71 may be used as a means for supporting delivery means roof 39. Additionally the upper portion of the chamber includes a ceiling or roof 73 preferably constructed of a refractory material suitable for radiating or absorbing heat uniformly over the area facing the glass beneath it during operation. Extending through the ceiling of the forming chamber are controllable heating elements 75 used to control the rate of heat removal from the glass during forming. These heating elements are connected to bus bars 77 which are connected, in turn, to a source of electric power (not shown). The upper portion of the forming chamber 15, preferably includes a top casing end wall 79 providing a space between the upper portion of the forming chamber 15 and the upstream or furnace side of the conveyor mechanism 17. During operation of protective gas, such as a mixture of hydrogen and nitrogen or other non-oxidizing gas, is preferably directed into the forming chamber and conveyor.

Advancing along the surface of the pool of molten tin 66 is a continuous sheet of glass 81 formed from the layer of molten glass 49 delivered onto the pool of molten tin for forming. Extending into the forming chamber through its sidewalls there may be provided edge contacting devices 83 for applying outward tractive force to the layer of glass 49 during its advance along the pool of molten metal for forming. These devices are preferably driven wheels disposed and driven in such manner as to apply opposing outward of transverse forces to the glass to maintain its width during its attenuation. The resultant forces resulting from the combination of longitudinal and transverse forces acting on the glass cause it to be attentuated to a thickness that is less than that which would be attained by molten glass if allowed to remain on the surface of the pool of molten metal for a sufficient time to come to equilibrium with it. The present invention is most needed when edge-contacting devices 83 are not employed for when they are used the glass orientation at lift-off is more stable than when the edge contacting devices are not employed.

Extending into the chamber beneath the conveyor 17 at a location near where the glass is to be lifted from the pool of molten metal, there are coolers 89 each disposed partially transversely across the forming chamber from near a sidewall 63 of the chamber. One cooler extends over the left marginal edge of the sheet of glass 81 and one cooler extends over the right marginal edge of the sheet of glass. It is through the controlled use of such coolers 89 that the temperature of the sheet of glass along one marginal edge is selectively adjusted and maintained relative to the temperature along the other marginal edge of the sheet of glass to cause the glass to lift from the pool of molten metal along a line normal or perpendicular to the horizontal path of glass advance and normal or perpendicular to the upward path of glass conveyance. Then, as the glass is conveyed away from the pool of molten metal, it is in a plane sharing a common normal plane with the horizontal plane of the advancing glass. This insures alignment between the upwardly moving glass and the plane defined by the glass engaging faces of the conveyor elements with the result that entry of the glass into engagement by the conveyor elements does not produce uneven stresses in the glass across its width.

The vertical conveyor 17 comprises a machine casing 91 and thermally insulated machine wall 93. The machine wall 93 are preferably constructed of refractory material. Within the preferred vertical conveyor there is a series of supporting rolls 95 for engaging a continuous sheet of glass 81 and for conveying it upwardly through the conveyor. These machine rolls are operated in a coordinated manner. They are used to apply sufficient tractive forces to the glass to convey it upwardly and to transmit tractive forces along the glass downwardly and about the curved glass at liftoff to the hot or more fluid glass within the advancing layer of glass 49. There, the glass, which is hotter and more fluid, is susceptible to forming attenuation due to the imposition of these tractive forces.

Disposed across the internal space within the conveyor casing at several locations along its length are machine seals 97 for retarding the flow of gases either upwardly or downwardly through the enclosed space surrounding the rolls 95. Extending through the walls of the enclosed conveyor openings 99 through which broken glass or cullet may be directed in the event the continuous sheet of glass is chipped or broken in the upper portion of the conveyor. A space is provided between the top casing of the forming chamber and the walls of the vertical conveyor for accommodating cullet removal. This space is characterized as a cullet chamber 101.

In a preferred embodiment of this invention, coolers 103 are disposed across the bottom portion of the vertical conveyor to control the removal of heat from a continuous sheet of glass 81 as it is conveyed upwardly from the surface of the pool of molten metal of the forming chamber.

Figure 3B:
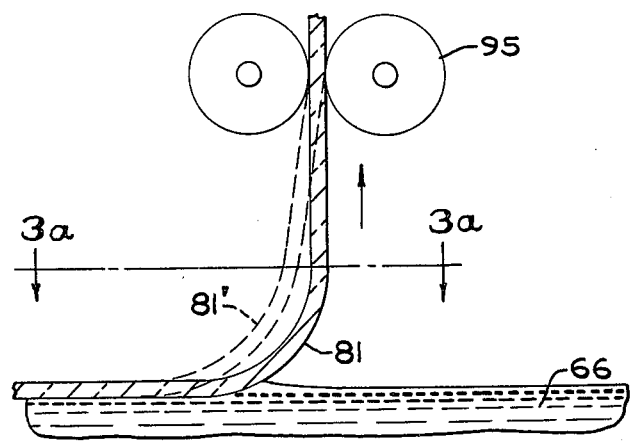
FIGS. 3A, 3B, and 3C are partial sectional schematic views of the liftoff location in a forming chamber such as shown in FIGS. 1 and 2 showing detail the effect of selective marginal edge coolant upon the orientation of a continuous sheet of glass immediately before and after lifting from the surface of a supporting pool of molten metal.
Figure 3A:
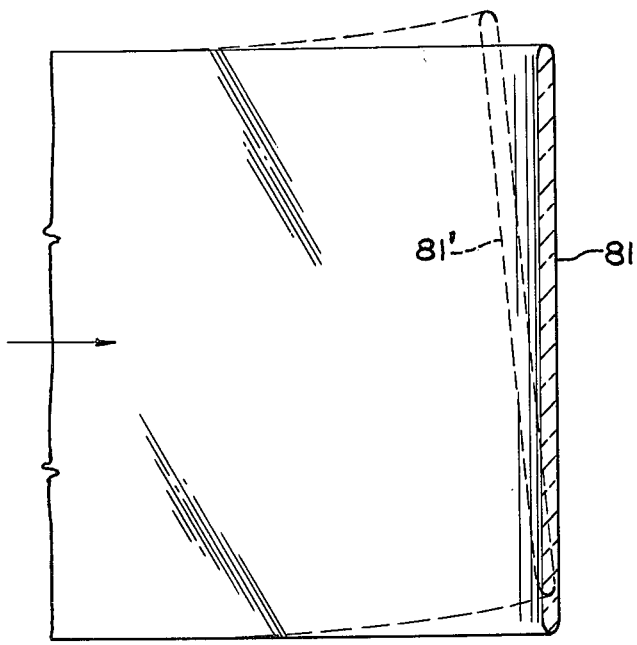
Figure 3C:
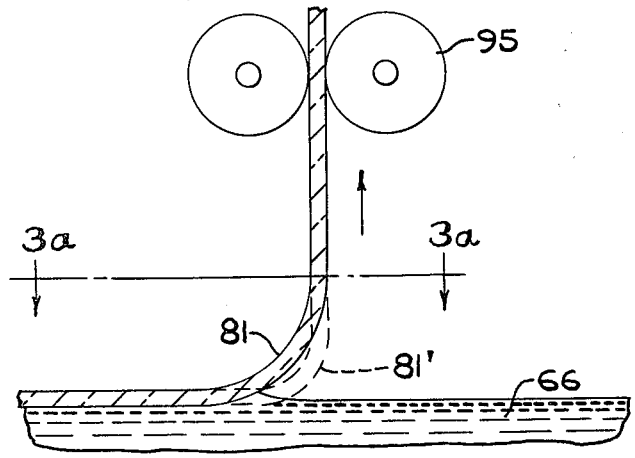

In FIGS. 3A, 3B, and 3C, there are shown several schematic views of a continuous sheet of glass 81 being lifted upwardly from a supporting pool of molten metal 66. FIGS. 3B and 3C show sectional elevation views of the glass sheet near the left and right marginal edges of the sheet, respectively.

FIG. 3A shows a schematic sectional plan view of the continuous sheet of glass in the vicinity where it is lifted from the pool of molten metal with the view taken along section lines 3A—3A of FIGS. 3B and 3C. Two continuous sheets of glass are represented in these drawings — is shown by solid lines and represents a continuous sheet of glass 81 having its orientation properly controlled according to this invention, and one is shown by broken lines and indicates a continuous sheet of glass 81' that is misaligned or disoriented. Such misalignment may be encountered in the production of flat glass as it is lifted upwardly from a pool of molten metal. This misalignment is corrected by practicing the present invention.

Referring first to the misaligned sheet 81' shown in the drawing by the broken lines, it is observed that while the sheet is advancing horizontally along the surface of the pool of metal 66 in the forming chamber, it is drifting along the left side of the chamber and the radius of curvature of the left marginal portion of the continuous sheet of glass 81' is larger than desired. The misaligned sheet of glass enters the lowermost traction rolls 95 of a conveyor at an angle, and the sheet must be stressed and returned to the plane of the conveyor by the mechanical forces applied to it due to contact with the rolls 95. Meanwhile, the right marginal edge portion of the misaligned continuous sheet of glass 81' is seen to be drifting toward the center of the forming chamber and then moving upwardly from the pool of molten metal with a relatively sharp or short radius of curvature. By applying the principles of this invention, the rate of cooling of the right marginal edge portion of the continuous sheet of glass is increased while the rate of cooling of the left marginal edge portion of the continuous sheet of glass is decreased until the radius of curvature of the continuous sheet of glass, as it is being lifted from the pool of molten metal, is made uniform at both marginal edges and the upwardly ascending portion of the continuous sheet of glass 81 below the first pair of engaging traction rolls 95 in the conveyor is aligned with the plane of the conveyor as shown by the continuous sheet of glass represented by solid lines in FIGS. 3A, 3B, and 3C.

Figure 2:
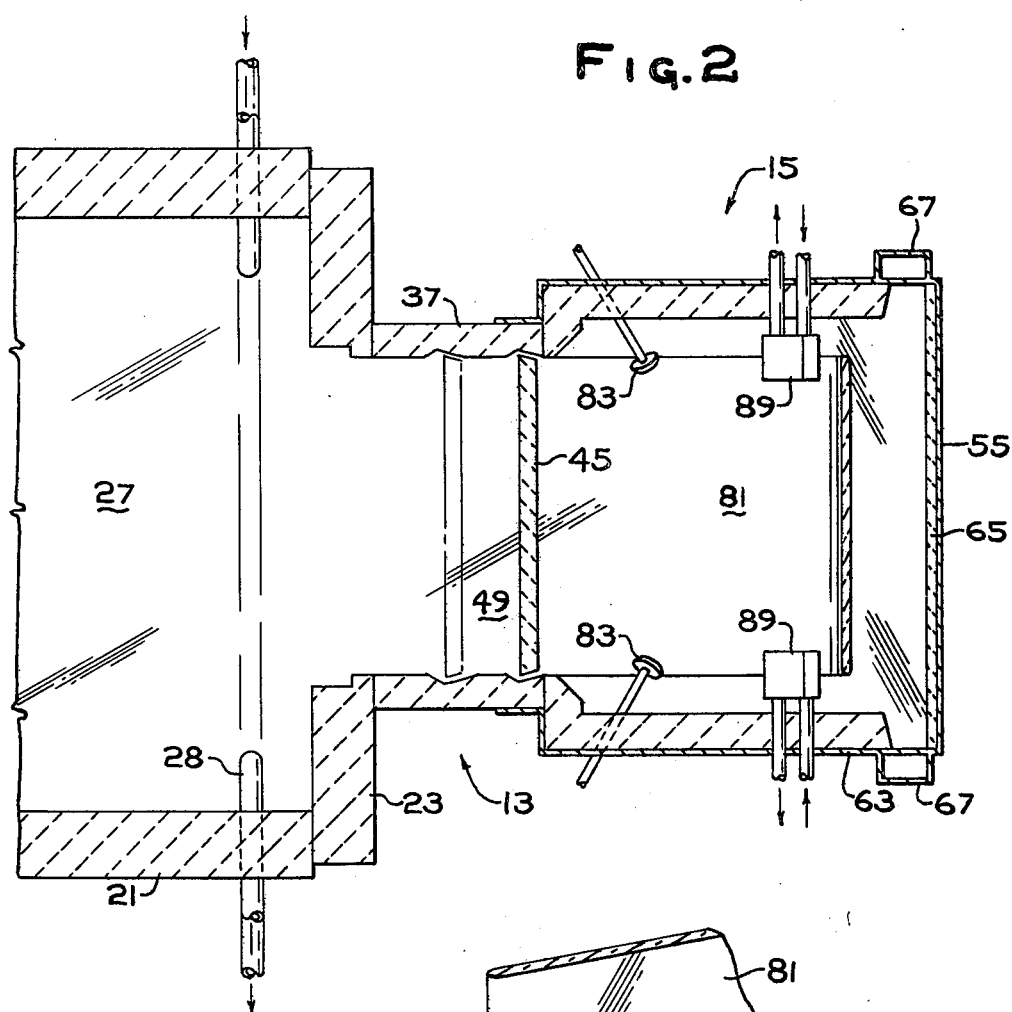
FIG. 2 is a sectional plan view of the apparatus shown in FIG. 1.

The left and right elements of the temperature control device 89 shown in FIGS. 1 and 2 act upon the marginal edge portions of the continous sheet of glass 81 primarily by radiant cooling of those marginal edge portions. The temperature control device 89, which is a pair of coolers in the embodiment illustrated, is spaced above the horizontally advancing sheet of glass just upstream of the location for lifting the glass from the pool of molten metal. It faces the top surface of the continuous sheet of glass during the final portion of its horizontal advance and also faces that same surface of the continuous sheet of glass as it is conveyed upwardly from the surface of the pool of molten metal. Since the cooler 89 also cool the gaseous atmosphere within the forming chamber, they also effectively cool the adjacent continuous sheet of glass by convective cooling. Nevertheless, their effect upon the glass is primarily a thermal radiation effect.

In another embodiment of this invention the temperatures of the marginal edge portions of the continuous sheet of glass are adjusted and maintained by acting upon the glass through the molten metal in contact with it. In this embodiment of the invention, heat transfer between the glass and the temperature adjusting means is primarily effectuated by conductive heat transfer. Two specific facilities for practicing this embodiment of the invention are shown in FIGS. 4, 5, 6 and 7. The devices shown for practicing this embodiment of the invention include submerged cooling elements extending beneath the marginal edge portions of a continuous sheet of glass and submerged within the pool of molten metal beneath the glass. The embodiment of the invention shown in FIGS. 4 and 5 comprises two coolers 101 and 101' extending through the sealed end wall opening 70 of a forming chamber. Each cooler extends downwardly into the molten metal 66 within the chamber beneath the location for lifting the continuous sheet of glass 81 from the surface of the pool of molten metal. These coolers are separately controllable by independently adjusting the flow of coolant, such as water, through the left cooler 101 and the right cooler 101'.

The embodiment of this invention as shown FIGS. 6 and 7 comprises separate coolers 105 and 105' extending, respectively, through the left and right sidewalls 63 of a forming chamber. Each cooler is partially submerged in the molten metal 66 beneath the location at which the continuous sheet of glass 81 is to be lifted from the surface of the pool of molten metal. The relative rate of heat removal between the left and right marginal portions of a continuous sheet of glass 81 is adjusted by controlling the relative flow rates of coolant through coolers 105 and 105'.

Figure 8:
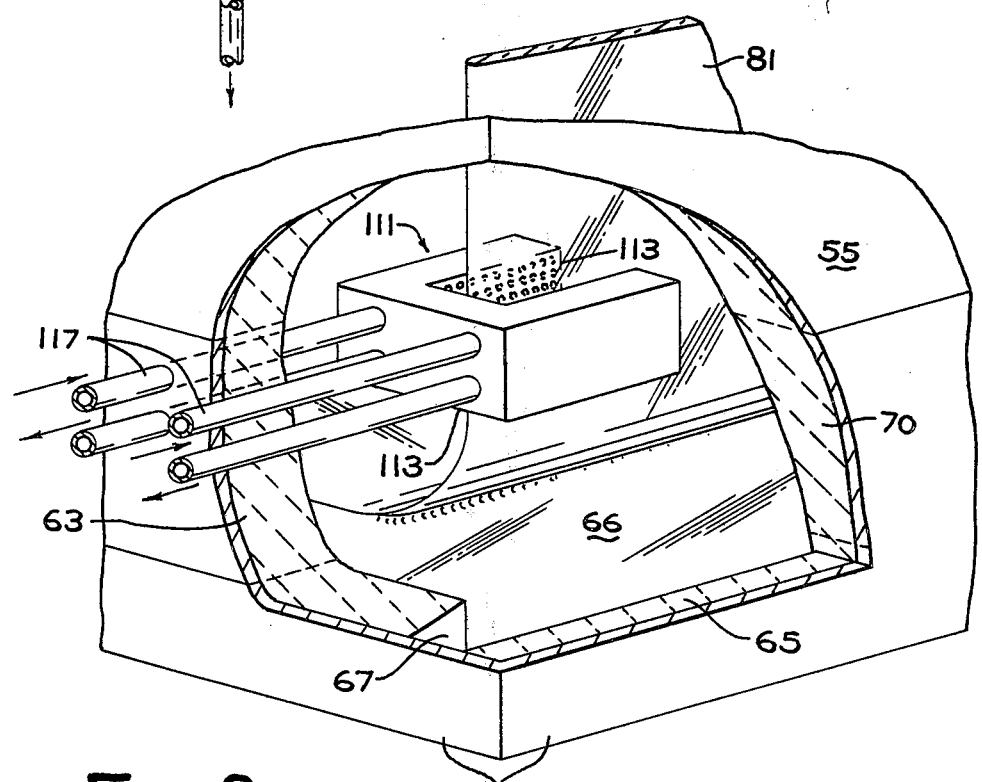
FIG. 8 shows a further embodiment of this invention in a partially cutaway perspective view of the liftoff region of a flat glass forming chamber employed in the practice of this invention.

The embodiment of the invention shown in FIG. 8 provides for selective radiant heat transfer between a glass sheet and a pair of temperature controlling devices 111 each of which partially surrounds a marginal edge portion of a continuous sheet of glass 81. Each device 111 includes interior faces 113 and a bottom face 115 which face the glass and interact thermally with it. Each heat transfer device 111 is connected to a plurality of conduits 117 for directing a coolant to selected portions of the heat transfer device 111. The glass facing surface 113 and 115 of the heat transfer device are preferably honeycombed, dimpled or otherwise roughened to increase their thermal emissivity. This enhances the rate of radiant heat transfer between the glass and the heat transfer device 111.

In the practice of this invention the orientation and position of a sheet of glass may be detected by mechanical, optical or other detecting means, and, using conventional controllers and control techniques, the conditions imposed by the temperature adjusting means on each side of the forming chamber are made to differ or vary in order to enhance the rate of response of the process. It is convenient and generally sufficient to visually observe the glass during lifting and to manually adjust the rate of cooling or gas flow for each of the forming chamber.

In the practice of this invention the glass may be delivered to the forming chamber by any convenient technique, such as pouring, flowing, directing a preformed ribbon and remelting it or otherwise.

Although this invention has been described with reference to particular embodiments of it and has been illustrated by specific examples, those skilled in the art of glass manufacture will recognize that departures may be made from these specific embodiments of the invention without departing from the invention itself.

I claim:

1. In an apparatus for making flat glass comprising and enclosed forming chamber having an upstream inlet end, a downstream outlet end, a bottom portion containing a pool of molten metal, a pair of sidewalls extending from the upstream end to the downstream end of the chamber and a roof portion providing a headspace above the pool of molten metal; means for delivering molten glass to the forming chamber at its upstream end and onto the pool of molten metal; means for advancing the glass along the surface of the pool of molten metal and for applying forces to it to form a continuous sheet of glass; means for sufficiently cooling the glass during its advance to cause the formed continuous sheet of glass to be dimensionally stable; means for lifting the formed continuous sheet of glass upwardly from the pool of molten metal; and means for conveying the lifted sheet of glass upwardly from the forming chamber, the improvement comprising:

means for individually adjusting the temperatures of the marginal edge portions of the dimensionally stable sheet of glass during lifting for controlling the alignment of the sheet of glass while conveying it upward wherein said temperature adjusting means includes at least one cooler on each side of the chamber in the headspace above the glass and having a cooling face facing the advancing glass on the pool of molten metal and a cooling face facing the upwardly conveyed glass, each cooling face being effective for removing sufficient heat from the glass to control the location at which the glass facing the cooling lifts from the molten metal.

2. The apparatus according to claim 1 wherein each glass facing surface of the cooler has sufficient emissivity to cause heat transfer between the glass and the cooler to be primarily radiant heat transfer.

3. In an apparatus for making flat glass comprising an enclosed forming chamber having an upstream inlet end, a downstream outlet end, a bottom portion containing a pool of molten metal, a pair of sidewalls extending from the upstream end to the downstream end of the chamber and a roof portion providing a headspace above the pool of molten metal; means for delivering molten glass to the forming chamber at its upstream end and onto the pool of molten metal; means for advancing the glass along the surface of the pool of molten metal and for applying forces to it to form a continuous sheet of glass; means for sufficiently cooling the glass during its advance to cause the formed continuous sheet of glass to be dimensionally stable; means for lifting the formed continuous sheet of glass upwardly from the pool of molten metal; and means for conveying the lifted sheet of glass upwardly from the forming chamber, the improvement comprising:

means for individually adjusting the temperatures of the marginal edge portions of the sheet of glass during lifting for controlling the alignment of the sheet of glass while conveying it upwardly, wherein said temperature adjusting means comprises a plurality of coolers at least partially submerged in the pool of molten metal beneath the location at which the sheet of glass is lifted upwardly therefrom, at least one cooler being positioned to beneath each marginal edge portion of an advancing sheet of glass immediately prior to lifting.

4. The apparatus according to claim 3 wherein two coolers extend inwardly from the downstream end of the forming chamber into the chamber and into the pool of molten metal beneath the means for conveying the glass upwardly from the pool of molten metal, one color being closely spaced from one sidewall and the other cooler being closely spaced from the other sidewall.

5. The apparatus according to claim 3 wherein two coolers extend inwardly from the sidewalls of the forming chamber into the chamber and into the pool of molten metal substantially beneath the means for conveying the glass upwardly from the pool of molten metal, each cooler entending inwardly from its respective sidewall a sufficient distance to be beneath a marginal edge portion of an advancing sheet of glass.

6. The apparatus according to claim 1 wherein each cooler is a cooler partially surrounding a plane along which a sheet of glass is to be upwardly conveyed providing two cooling faces facing the upwardly conveyed glass and the cooling face of the cooler facing the advancing glass and the pool of molten metal is smaller than the cooling faces facing the upwardly conveyed glass.

7. The apparatus according to claim 6 wherein glass facing cooling faces have sufficient emissivity to cause heat transfer between the glass and the cooler to be primarily radiant heat transfer.

8. The apparatus according to claim 5 wherein the glass facing surfaces of the coolers are dimpled.

9. In a method of making glass comprising the steps of delivering molten glass onto a pool of molten metal in a bottom portion of a forming chamber having an upstream end, sidewalls, a downstream end, and a roof portion enclosing a headspace above the pool of molten metal; advancing the glass along the surface of the pool of molten metal toward the downstream end of the forming chamber; cooling the glass during its advance and applying forces thereto to form a continuous sheet of glass; thereafter lifting the sheet of glass upwardly from the pool of molten metal and conveying it upwardly therefrom, the improvment comprising;

individually adjusting the temperature of the marginal edge portions of the sheet of glass during lifting to control the alignment of the sheet of glass while conveying it upwardly, by extracting sufficient heat from one marginal edge portion of the sheet of glass to increase the radius of curvature of that marginal edge portion relative to the radius of curvature of the other marginal edge portion of the sheet of glass.

10. In a method of making glass comprising the steps of delivering molten glass onto a pool of molten metal in a bottom portion of a forming chamber having an upstream end, sidewalls a downstream end, and a roof portion enclosing a headspace above the pool of molten metal; advancing the glass along the surface of the pool of molten metal toward the downstream end of the forming chamber; cooling the glass during its advance and applying forces thereto to form a continuous sheet of glass; thereafter lifting the sheet of glass upwardly from the pool of molten metal and conveying it upwardly therefrom, the improvement comprising:

individually adusting the temperature of the marginal edge portions of the sheet of glass during lifting to control the alignment of the sheet of glass while conveying upwardly, wherein the temperature of the marginal edge portions of the sheet of glass are adjusted to increase the radius of curvature of the marginal edge portion of the glass sheet during lifting on the side of the sheet that is farthest from a forming chamber sidewall.

11. In a method of making glass comprising the steps of delivering molten glass onto a pool of molten metal in a bottom portion of a forming chamber having an upstream end, sidewalls, a downstream end, and a roof portion enclosing a headspace above the pool of molten metal; advancing the glass along the surface of the pool of molten metal toward the downstream end of the forming chamber; cooling the glass during its advance and applying forces thereto to form a continuous sheet of glass; thereafter lifting the sheet of glass upwardly from the pool of molten metal and conveying it upwardly therefrom, te improvement comprising:

individually adjusting the temperature of the marginal edge portions of the sheet of glass during lifting to control the alignment of the sheet of glass while conveying it upwardly, wherein the temperatures of the marginal edge portions of the sheet of glass are adjusted to decrease the radius of curvature of the marginal edge portion of the glass sheet during lifting on the side of the sheet that is closest to a forming chamber sidewall.

12. In a method of making glass comprising the steps of delivering molten glass onto a pool of molten metal in a bottom portion of a forming chamber having an upstream end, sidewalls, a downstream end, and a roof portion enclosing a headspace above the pool of molten metal; advancing the glass along the surface of the pool of molten metal toward the downstream end of the forming chamber; cooling the glass during its advance and applying forces thereto to form a continuous sheet of glass; thereafter lifting the sheet of glass upwardly from the pool of molten metal and conveying it upwardly therefrom, the improvement comprising:

individually adjusting the temperature of the marginal edge portions of the sheet of glass during lifting to control the alignment of the sheet of glass while conveying it upwardly, wherein the temperatures of the marginal edge portions of the sheet of glass are adjusted to increase the radius of curvature of the marginal edge portion of the glass sheet during lifting on the side of the sheet that is closest to the downstream end of the forming chamber when first lifted.

13. In a method of making glass comprising the steps of delivering molten glass onto a pool of molten metal in a bottom portion of a forming chamber having an upstream end, sidewalls, a downstream end, and a roof portion enclosing a headspace above the pool of molten metal; advancing the glass along the surface of the pool of molten metal toward the downstream end of the forming chamber; cooling the glass during its advance and applying forces thereto to form a continuous sheet of glass; thereafter lifting the sheet of glass upwardly from the pool of molten metal and conveying it upwardly therefrom, the improvement comprising;

individually adjusting the temperature of the marginal edge portions of the sheet of glass during lifting to control the alignment of the sheet of glass while conveying it upwardly, wherein the temperatures of the marginal edge portions of the sheet of glass are adjusted to decrease the radius of curvature of the marginal edge portion of the glass sheeting during lifting on the side of the sheet that is farthest from the downstream end of the forming chamber when first lifted.

14. The method according to claim 9 wherein the heat extracted from the glass is primarily extracted through the molten metal.

15. The method according to claim 9 wherein the heat extracted from the glass is primarily extracted by radiant heat transfer.

* * * * *

UNITED STATES PATENT OFFICE
CERTIFICATE OF CORRECTION

PATENT NO. : 3,928,011
DATED : December 23, 1975
INVENTOR(S) : James R. Schornhorst It is certified that error appears in the above-identified patent and that said Letters Patent are hereby corrected as shown below:

Column 8, line 63, "and" should be --an--.

Column 9, line 16, "upward" should be --upwardly--.

Column 9, line 24, "cooling" should be --cooler--.

Column 9, line 55, insert --be-- between "to" and "beneath".

Column 9, line 63, "color" should be --cooler--.

Column 10, line 18, "claim 5" should be --claim 6--.

Column 10, line 44, insert a comma (--,--) after "sidewalls".

Column 10, line 56, insert --it-- between "conveying" and "upwardly".

Column 11, line 5, "te" should be --the--.

Column 12, lines 23-24, "sheeting" should be --sheet--.

Signed and Sealed this thirteenth Day of April 1976

[SEAL]

Attest:

RUTH C. MASON
Attesting Officer

C. MARSHALL DANN
Commissioner of Patents and Trademarks